Patented Apr. 28, 1925.

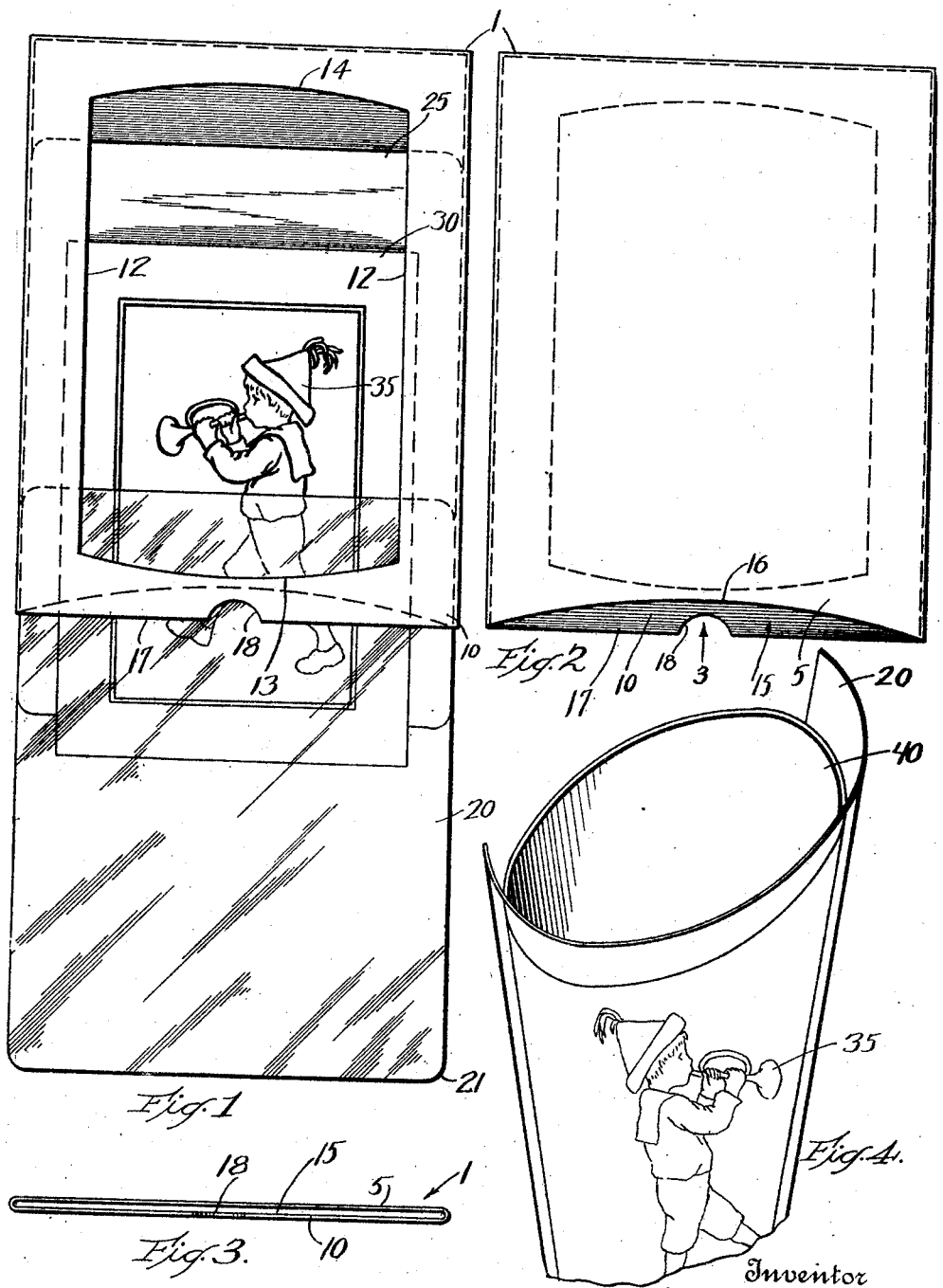

1,535,242

UNITED STATES PATENT OFFICE.

SHERMAN LINCOLN PARMENTER, OF NEW ROCHELLE, NEW YORK.

TRACING AND PRINTING DEVICE.

Application filed March 29, 1921. Serial No. 456,700.

*To all whom it may concern:*

Be it known that I, SHERMAN LINCOLN PARMENTER, a citizen of the United States, residing at New Rochelle, in the county of Westchester and State of New York, have invented new and useful Improvements in Tracing and Printing Devices, of which the following is a specification.

My invention relates to tracing and printing devices and has for an object to provide a method and means whereby sketches or pictures may be copied and transferred readily and accurately from an original drawing to other suitable surfaces such as paper, non-transparent cloth, china or similar materials in connection with which tracing in the strict sense of the term is impossible.

Generally described, my apparatus comprises a thin sheet or tablet of transparent flexible material, one or both sides of which are adapted to receive markings by tracing or otherwise, with means for holding the transparent tablet immovably upon the surface having the picture or design which it is desired to trace or reproduce.

I am aware that appliances have been made for children's use which consist of a frame having interior rabbeted grooves for holding a panel of glass with a ground surface to receive markings from an ordinary lead pencil, having a back and other retaining means for holding a set of drawings to be traced. Even for tracing purposes these devices have been employed to serve only rudimentary educational and amusement uses, and have had a definitely limited vogue owing, among other reasons, to the many disadvantages incident to the use by young children of a glass plate in this connection.

The glass plate, furthermore, in order to receive the lines of a drawing, must have its tracing surface roughened by grinding off the smooth, glazed surface, which not only to an objectionable degree obscures the drawing to be traced, but in a large measure interferes with the free, natural and effective use of the pencil. Moreover, the glass being brittle and highly fragile when used in the manner indicated must be made with a considerable thickness so as to give to it sufficient strength to be handled safely, and this thickness necessarily separates the surface to an objectionable extent from the lines being traced, thereby increasing the difficulties to be encountered in the process of copying, correspondingly tending to reduce the accuracy of the sketch made upon the glass plate. The fragile nature of common window glass is also objectionable in that it requires a frame of considerable length to insure against injury to the device or the user, especially when in the hands of young children.

I find therefore that by employing a very thin transparent sheet of flexible material, such as celluloid, for example, it does not require a frame device, except in so far as a holder may be employed to maintain the sheet in a relatively fixed position upon the surface over which the tracing is being made, and furthermore the thin form in which commercial celluloid is available as pointed out brings the tracing surface into very close contact with the figure from which the copy is being made.

In another important way I find celluloid useful for the purposes of my invention, in that its smooth, glassy surfaces will receive and retain markings from many types of lead pencils and crayons which make insufficient markings upon the hard, smooth surface of glass which has not been ground or frosted.

Thus far I have set out the advantages of the use of a material of the nature and general characteristics of celluloid for tracing purposes only, but my invention has a further important object in providing means for transferring a tracing to a non-transparent substance, whereby the tracing step is only the initial use thereof. By employing a reasonably soft lead pencil or preferably a wax crayon, the drawing or sketch thus made upon the thin sheet of celluloid may be imprinted upon paper, cloth or other similar material, by rubbing the opposite or unmarked side of the celluloid when its figured face is in immediate contact with the surface to be printed upon.

The celluloid sheet thus employed being thin may be laid upon the surface of china, wood or other hard, inflexible material, when by rubbing the reverse side of the celluloid negative, a perfect copy would be made upon such surface.

In addition to the foregoing objects of my invention, its use is further extended because of the absence of the necessity for employing a frame to protect the glass plate from being broken or from injuring the hands of the users. Thus I find it only necessary as pointed out to provide means for the comparatively limited purpose of holding the celluloid sheet from moving after the tracing has been commenced. Thus, while many simple designs and sketches may be traced speedily and readily without any other aid than the user's free hand, in holding the transparent sheet over the picture being traced, I find in the vast majority of uses to which my invention is adapted that artificial holding means are desirable, and accordingly such means are here illustrated, not with the intention of indicating the exact type or form such may assume. For example, in the drawings a pocket-like frame or envelope is shown for holding the celluloid sheet over the picture, to be copied from or the sheet to be printed upon. But when other than a loose leaflet is thus employed, any convenient device may be employed, such as clips for use in connection with a page of a bound volume, and still other types of clamping devices may obviously be employed when the form or nature of the object to be copied from or upon so requires.

Having reference to the drawings illustrative of a preferred form of my invention, Figure 1 is a tracing frame in the form of a frame pocket having one side cut out and containing a transparent sheet partially inserted over a picture card.

Fig. 2 is a view of a reverse side of the frame, its contents having been removed.

Fig. 3 is an endwise view looking in the direction of the arrow at 3 in Fig. 2; and Fig. 4 is a perspective view of the transparent sheet shown in Fig. 1 upon a round object.

Referring to the drawings, the numeral 1 represents an envelope or frame pocket having a closed back 5 and open front 10 which in its general features corresponds to a holder similar in shape to those ordinarily used for card photographs, the envelope being formed in any convenient way. In the illustrated form of frame holder 1 its opening 11 has a straight margin 12 from top to bottom and curved edges 13 and 14 at the ends, the curved form 14 serving the useful purpose of guiding past its edge the forward end of a card or sheet of material having a straight or a square end, as shown in Fig. 1. The bottom edge 13 may be correspondingly curved for purposes of symmetry or balance, but the curving of this edge is not deemed essential in the sense of the curvature 14 for the reason explained.

The form and size of the pocket or holder 1 is predetermined by the width of the transparent sheet which it is adapted to hold and the sheets of paper or picture cards may be trimmed down to a size that will permit of their being slipped into the holder 1 through the mouth 15 which has a curved lip 16 and a straight lip 17 with the semicircle thumb notch 18 medially located in the latter. The relative arrangement of the edges 16 and 17 is best shown in Fig. 2, where it is readily seen that this construction will assist as hereinafter described in inserting the sheet 20 or other contents into the holder, the thumb notch co-operating with the curved edge 16 to facilitate the gripping of the ends of the contents preparatory to withdrawal from the case, in the form shown, the straight edge and thumb notch being associated with the open or front side 10.

While I have described these two lips as being the one straight and the other curved, it is obvious that both could be straight or curved and serve the same purpose if their respective edges did not coincide, yet as a preferred construction that of the drawings is described as one of the features of my complete holder.

The tracing sheet 20 is made of a thin and flexible transparent material such as sheet celluloid or mica, oiled paper or similar material, preferably the first mentioned for all purposes of general utility and adaptation, and it may be employed in any size. However when used with a frame or holder such as illustrated in the drawings, the envelope should hold the edges of the sheet snugly within the folds of the case, the four corners being rounded, as at 21. The sheet 20 when normally in position for use either in tracing or transferring will be adjacent the open or front side 10 and the sheet to be copied from or impressed upon will be inserted between the transparent sheet 20 and the back 5 of the envelope.

The sheet 20 is shown in Fig. 1 having partly entered the frame 1, a card 30 having upon its face a figure 35 of a boy with a horn is also shown partially within the holder 1 with the sheet 20 in position of being shoved into the pocket over the picture. Therefore if sheet 20 and card 30 be carried all the way to the bottom of the holder the outfit will be in position to have the lines of any figure 35 traced upon the outer face of the sheet 20.

The two sheets may then be withdrawn, the sheet 20 reversed for re-insertion, the figure thereby being reversed and upon the inner surface. Thereupon, by inserting a sheet of plain paper between the sheet 20 and the closed back 5 of the holder, the parts will be in position to effect a transference of the figure 35 to the under sheet of paper, which is completed by exerting a rubbing pressure upon the unmarked side of the transparent sheet which has been turned uppermost for the purpose.

The under sheet 30, or the white sheet to be imprinted upon, need not be of the exact size of the celluloid sheet for its frictional contact with the celluloid and the closed back surface of the envelope will hold the sheet of paper accurately in place while being traced or impressed.

I preferably employ soft wax crayons of black and various colors for tracing and find that several copies can be made from a single tracing by most of the well known makes of wax crayon pencils. There are other drawing and writing materials such as soft lead pencils and copying inks with which the initial tracing may be made which are capable of a considerable number of reproductions.

It has been seen that in making copies upon sheets of paper or other flat articles the holder 1 will adequately serve to hold the transparent sheet 20 upon the sheet 30 when tracing therefrom or impressing thereupon. In this manner and with the devices shown an amusing and educational toy is provided children at home and in the lower grades of school which will have a wider latitude of usefulness than the mere tracing device heretofore devised.

I do not however wish to be limited in the scope of my invention to its use as a toy merely wherein the flexible tracing element may only be employed with the envelope form described or any particular means for holding the transparent sheet relatively immovable upon the under surface. In Fig. 4 is shown the use of the sheet 20 upon an object 40 which has a curved surface, in contact with which the sheet may be held by the clips or otherwise as may be found most convenient.

Thus if it should be desired to copy a figure or design found upon the article 40 upon another object or on a flat surface the flexible transparent sheet may be held upon its surface by hand while the lines of the design are traced thereupon; or if it should be desired to transfer to a vessel similar to the object 40, for example, or one of different contour, as is often done in painting on china, a design or figure which has been traced in the manner indicated upon the sheet 20 may by rubbing the reverse or outer side of the sheet be similarly transferred while being held in the position shown in Fig. 4.

Likewise by attaching the sheet 20 to a printed page of a bound book, or merely inserting it between the leaves, its inner margin adjacent the bound edges of the leaves, the negative may be prepared, that is, the tracing made thereupon by using clips of many convenient types and in the same manner transfers from the negative to cloth patterns may be made for use in fancy needlework and embroidering.

Having described my invention, what I claim is:

1. In a device for transferring lines of pencil drawings and sketches, a thin transparent flexible element adapted to receive markings upon its face and means for holding said element relatively immovably upon surfaces to be traced from or transferred to, said holding means comprising an envelope frame having an open end adapted to receive said transparent element therethrough and an open side adapted to expose a surface of said element.

2. In a tracing device, a transparent sheet having straight sides and a straight end, substantially at right angles thereto, a pocket having a closed end and an open end for receiving said sheet therethrough, one side of said pocket being cut out with straight and curved edges, a curved edge being provided adjacent said closed end.

3. In a tracing device, a transparent sheet having an end with a substantially straight edge, a pocket frame for containing said sheet, said pocket having an open end for receiving said sheet therethrough and an open side for exposing a portion of said sheet, said open side having a curved edge opposite the open end of said frame.

In testimony whereof I have hereunto set my hand.

SHERMAN LINCOLN PARMENTER.